(12) United States Patent
Dai et al.

(10) Patent No.: US 9,791,153 B2
(45) Date of Patent: Oct. 17, 2017

(54) LINE REPLACEABLE FUEL NOZZLE APPARATUS, SYSTEM AND METHOD

(71) Applicant: United Technologies Corporation, Hartford, CT (US)

(72) Inventors: Zhongtao Dai, Glastonbury, CT (US); Kristin Kopp-Vaughan, East Hartford, CT (US); Dave Hyland, Portland, CT (US); Russell B. Hanson, Jupiter, FL (US); Lexia Kironn, Rocky Hill, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 261 days.

(21) Appl. No.: 14/634,057

(22) Filed: Feb. 27, 2015

(65) Prior Publication Data
US 2016/0252252 A1    Sep. 1, 2016

(51) Int. Cl.
*F23D 17/00*    (2006.01)
*F23R 3/28*    (2006.01)
(Continued)

(52) U.S. Cl.
CPC .................. *F23R 3/28* (2013.01); *F02C 3/04* (2013.01); *F02C 7/22* (2013.01); *F23D 17/002* (2013.01);
(Continued)

(58) Field of Classification Search
CPC .... F23R 3/04; F23R 3/14; F23R 3/286; F23R 3/30; F23R 3/36; F23R 3/343; F23C 1/10;
(Continued)

(56) References Cited

U.S. PATENT DOCUMENTS 3,690,093 A * 9/1972 Carlisle ..................... F23R 3/36
239/400
2005/0086944 A1 * 4/2005 Cowan .................. F23D 17/002
60/776
(Continued)

FOREIGN PATENT DOCUMENTS

EP    1526333    4/2005
WO    2009148680    12/2009

OTHER PUBLICATIONS

GE Foundation, Nov. 17, 2014, availabe at url: http://www.gefoundation.com/new-research-center-will-take-3d-printing-to-the-next-level/.*
(Continued)

*Primary Examiner* — Gerald L Sung
*Assistant Examiner* — Marc Amar
(74) *Attorney, Agent, or Firm* — Timothy Buckley; Snell & Wilmer L.L.P.

(57) ABSTRACT

In various embodiments, a fuel injector may comprise a fuel nozzle and a pilot stage. The fuel nozzle may define a main fuel channel, a secondary fuel channel, a simplex fuel channel and a heat shield area. The main fuel channel may be disposed about at least a portion of the simplex fuel channel. The secondary fuel channel may be disposed about at least a portion of the simplex fuel channel. The heat shield area may be configured to separate and protect the fuel channels from a heat load to prevent fuel coking. The pilot stage may be operatively coupled to the fuel nozzle and may be configured to receive fuel from the secondary fuel channel or the simplex fuel channel. The main stage may be operatively coupled to the fuel nozzle. The main stage may be configured to receive fuel from the main fuel channel.

20 Claims, 5 Drawing Sheets

(51) Int. Cl.
　　　F23R 3/36　　　(2006.01)
　　　F23R 3/14　　　(2006.01)
　　　F23R 3/34　　　(2006.01)
　　　F02C 3/04　　　(2006.01)
　　　F02C 7/22　　　(2006.01)
　　　F23R 3/60　　　(2006.01)

(52) U.S. Cl.
　　　CPC .......... *F23R 3/14* (2013.01); *F23R 3/286* (2013.01); *F23R 3/343* (2013.01); *F23R 3/36* (2013.01); *F23R 3/60* (2013.01); *F05D 2220/32* (2013.01); *F05D 2240/35* (2013.01); *F23R 2900/00004* (2013.01); *F23R 2900/00018* (2013.01)

(58) Field of Classification Search
　　　CPC .......... F23C 1/12; F23D 14/02; F23D 17/002; F02C 7/222
　　　USPC .......................................................... 60/742
　　　See application file for complete search history.

(56) References Cited

U.S. PATENT DOCUMENTS

2009/0255262 A1* 10/2009 McMasters ............... F23R 3/14
　　　　　　　　　　　　　　　　　　　　　　　　　　　60/742
2014/0291418 A1* 10/2014 Ruffing .................... F23R 3/14
　　　　　　　　　　　　　　　　　　　　　　　　　　　239/403

OTHER PUBLICATIONS

Extended European Search Report dated Jun. 30, 2016 in European Application No. 15201369.4.

* cited by examiner

LINE REPLACEABLE FUEL NOZZLE APPARATUS, SYSTEM AND METHOD

GOVERNMENT LICENSE RIGHTS

These inventions were made with government support under NNC13TA45T awarded by The National Aeronautics and Space Administration. The government has certain rights in the inventions.

FIELD

The present disclosure relates to gas turbine combustors, and more particularly, to a line replaceable fuel nozzle for a gas turbine engine.

BACKGROUND

Typical three (3) channel fuel injectors have traditional had relatively large, heavy, complicated, and expensive fuel nozzles. The size of the three (3) channel fuel nozzle made with traditional manufacturing and assembly techniques makes it difficult to be made as a line replaceable unit ("LRU") without significantly increasing the length of the combustor. In this regard, the overall size of the three (3) channel fuel nozzle used with the fuel injector has required significant disassembly operations to service traditional three (3) channel fuel injectors.

SUMMARY

In various embodiments, a fuel injector may comprise a fuel nozzle having a main stage and a pilot stage. The fuel nozzle may define a main fuel channel, a secondary fuel channel, a simplex fuel channel and a heat shield area. The main fuel channel may be disposed about at least a portion of the simplex fuel channel. The main fuel channel may be in fluid communication with and configured to conduct fuel to the main stage. The secondary fuel channel may be disposed about at least a portion of the simplex fuel channel. The heat shield area may be disposed about and configured to separate and protect the main fuel channel, the secondary fuel channel and the simplex fuel channel from a heat load to prevent fuel coking. The pilot stage may be operatively coupled to the fuel nozzle. The pilot stage may be configured to receive fuel from the at least one of, the secondary fuel channel, or the simplex fuel channel.

In various embodiments, a gas turbine engine may comprise a compressor, a combustor, and a turbine. A combustor may comprise a diffuser, a liner, a bulkhead, a cowl, and a fuel nozzle. The combustor may be in fluid communication with the compressor. The turbine may be in fluid communication with the combustor. The fuel injector may be removable installable within the combustor. The fuel injector may be configured to conduct fuel to the combustor. The fuel injector may comprise a fuel nozzle defining a main fuel channel, a secondary fuel channel, a simplex fuel channel and a heat shield area. The main fuel channel may be disposed about at least a portion of the simplex fuel channel. The secondary fuel channel may be disposed about at least a portion of the simplex fuel channel. The heat shield area may be disposed about and configured to surround the simplex fuel channel.

A fuel injector is provided. The fuel injector may comprise a fuel nozzle. The fuel nozzle may have an inlet. The fuel nozzle may define a main fuel channel, a secondary fuel channel, a simplex fuel channel and a heat shield area. The inlet may define a main flow area in fluid communication with the main fuel channel, a secondary flow area in fluid communication with the secondary fuel channel, and a simplex flow area in fluid communication with the simplex fuel channel. The main fuel channel may be disposed about at least a portion of the simplex fuel channel. The secondary fuel channel may be disposed about at least a portion of the simplex fuel channel. The heat shield area may be disposed about and configured to separate and protect all fuel channels from hot air environment. The fuel nozzle may be formed as a single piece.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
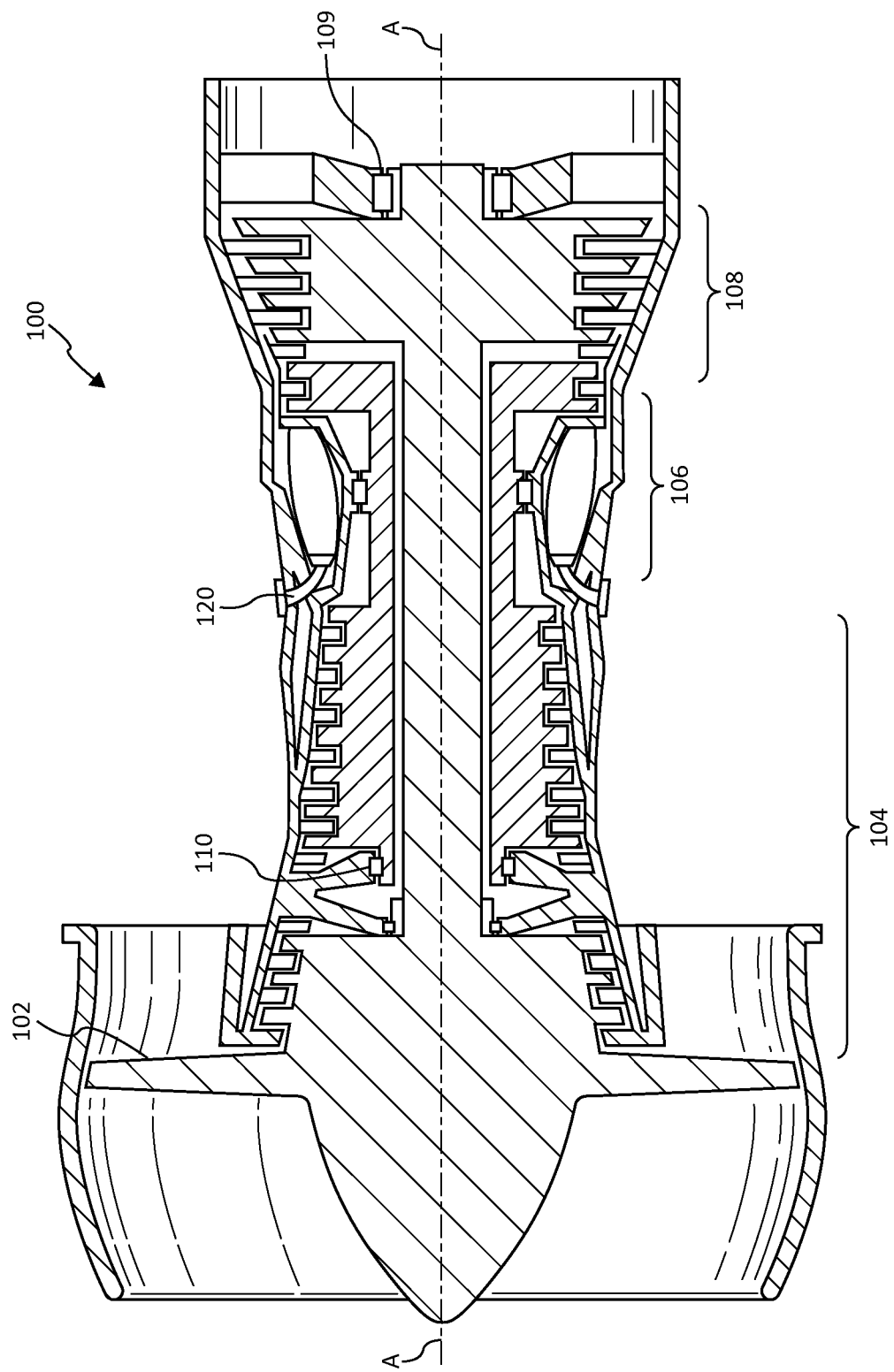
FIG. 1 illustrates cross-sectional view of an exemplary gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice these embodiments, it should be understood that other embodiments may be realized and that logical changes and adaptations in design and construction may be made in accordance with the present disclosure and the teachings herein. Thus, the detailed description herein is presented for purposes of illustration only and not for providing limitations on the scope of the disclosure. For example, the steps recited in any of the methods or process descriptions may be executed in any order and are not limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Moreover, surface shading lines may be used throughout the figures to denote different parts but not necessarily to denote the same or different materials.

As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Referring to FIG. 1, a gas turbine engine 100 (such as a turbofan gas turbine engine) is illustrated according to various embodiments. Gas turbine engine 100 is disposed about axial centerline axis A-A, which may also be referred to as axis of rotation A-A. Gas turbine engine 100 may comprise a fan 102, a compressor section 104, a combustion section 106, and a turbine section 108. Combustion section 106 may include a combustor that is configured to receive fuel from a fuel injector 120. In operation, air compressed in the compressor section 104 may be mixed with fuel, supplied via fuel injector 120, and burned in combustion section 106 and expanded across turbine section 108. Turbine section 108 may include high pressure rotors and low pressure rotors, which rotate in response to the expansion. Turbine section 108 may comprise alternating rows of rotary airfoils or blades and static airfoils or vanes. A plurality of bearings such as, for example bearings 109 and bearings 110 may support spools in the gas turbine engine 100. FIG. 1 provides a general understanding of the sections in a gas turbine engine, and is not intended to limit the disclosure. The present disclosure may extend to all types of turbine engines, including, for example, turbofan gas turbine engines and turbojet engines, aero-derivative gas turbine and other power generation engine, for all types of applications.

The forward-aft positions of gas turbine engine 100 are disposed along axis of rotation A-A'. For example, fan 102 may be referred to as forward of turbine section 108 and turbine section 108 may be referred to as aft of fan 102.

Typically, during operation of gas turbine engine 100, air flows from forward to aft, for example, from fan 102 to turbine section 108. As air flows from fan 102 to the more aft components of gas turbine engine 100, axis of rotation A-A may also generally define the direction of the air stream flow.

Figure 2A:
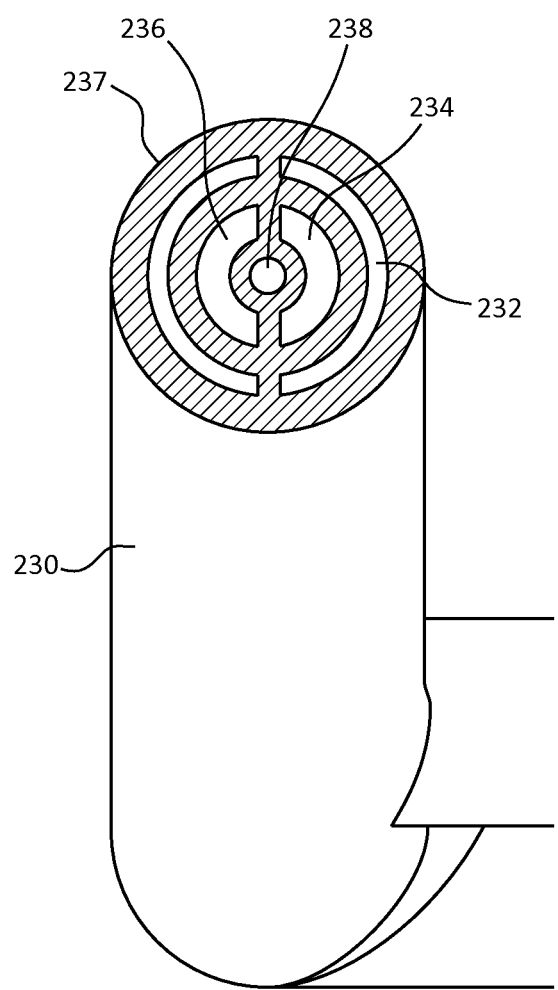
FIG. 2A illustrates a perspective top view of a portion of a fuel nozzle, in accordance with various embodiments.
Figure 2B:
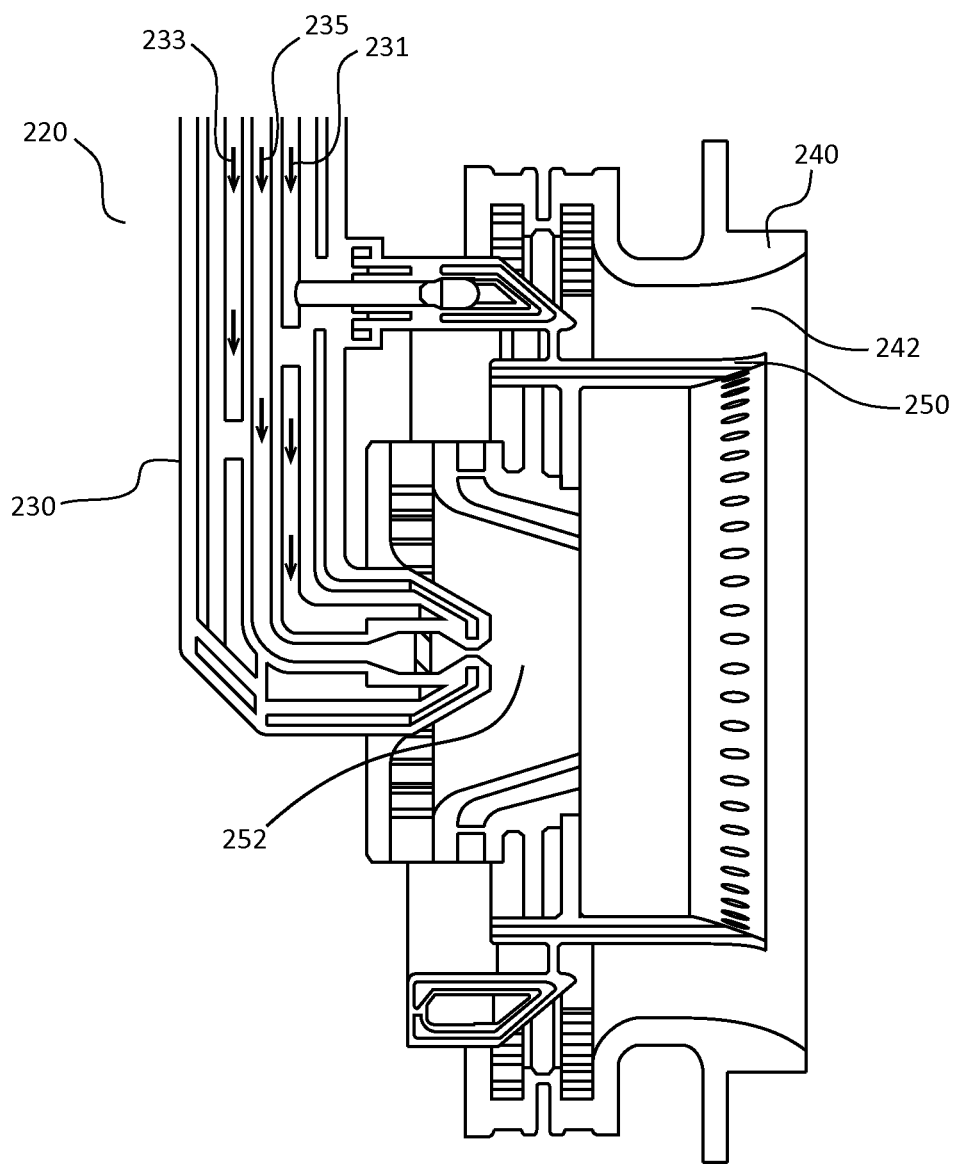
FIG. 2B illustrates a cross sectional view a portion of a gas turbine fuel injector, in accordance with various embodiments.

In various embodiments and with reference to FIG. 2A and FIG. 2B, fuel injector 220 may comprise a plurality of fuel channels. More specifically, a fuel nozzle 230 may comprise a plurality of fuel channels. Fuel nozzle 230 may comprise a first fuel channel 231 (e.g., main fuel channel 231). Fuel nozzle 230 may further comprise a secondary by second fuel channel 233 (e.g., secondary fuel channel 233). Fuel nozzle 230 may further comprise a third fuel channel 235 (e.g., simplex fuel channel 235). Third fuel channel 235 may be disposed in the center of fuel nozzle 230. First fuel channel 231 and second fuel channel 233 may be disposed about third fuel channel 235.

In various embodiments and with specific reference to FIG. 2A, fuel nozzle 230 may include an inlet 237. Inlet 237 may define a plurality of fuel channels. Inlet 237 may comprise a main flow area 234, a secondary flow area 236, a simplex flow area 238, and/or the like. Moreover, inlet 237 may comprise a heat shield area 232. Heat shield area 232 may be a channel configured to separate and protect the fuel channels from the hot air environment.

In various embodiments with reference again to FIG. 2A and FIG. 2B, main flow area 234 may be in fluid communication and/or may define an inlet to main fuel channel 231. Secondary flow area 236 may be in fluid communication with and/or may define an inlet to secondary fuel channel 233. Similarly, simplex flow area 238 may be in fluid communication with and/or may define an inlet to simplex fuel channel 235. In this regard, each of main flow area 234, secondary flow area 236 and/or simplex flow area 238 may be in fluid communication with the fuel source. Each of the flow areas may be configured to receive a fuel flow from the fuel source. Fuel from the fuel source may be conducted through the inlet flow area to one of main fuel channel 231, secondary fuel channel 233, and/or simplex fuel channel 235.

In various embodiments, fuel nozzle 230 may be in fluid communication with and/or configured to distribute fuel to a pilot stage 252 and/or a main stage 242. Pilot stage 252 may be defined by a pilot can 250. In this regard, pilot stage 252 may an internal volume defined by pilot can 250. Pilot stage 252 may be configured to receive fuel from secondary fuel channel 233 and simplex fuel channel 235. Main stage 242 may be the annular volume defined between pilot can 250 and radial swirler 240. Radial swirler 240 may be disposed about and/or may be configured to surround pilot can 250 and define a radially outward portion of main stage 242. Main stage 242 may be configured to receive fuel from main fuel channel 231. In this regard, fuel nozzle 230 may define three fuel flow paths configured to provide a distributed fuel pattern to a gas turbine engine combustor (e.g., combustion section 106, as shown in FIG. 1).

In various embodiments, heat shield area 232 may circumferentially surround each of main flow area 234, secondary flow area 236 and simplex flow area 238. Heat shield area 232 may be a dead cavity having no fluid communication with hot air environment, but may have fluid communication with one or more fuel channels such as, for example, main fuel channel 231, secondary fuel channel 233, and/or simplex fuel channel 235. In this regard, heat shield area 232 may be filled with fuel or fuel carbon to protect main fuel channel 231, secondary fuel channel 233, and/or simplex fuel channel 235 from coking. In other arrangements, heat shield area 235 may be configured to have fluid communication with hot air environment, but no fluid communication with main fuel channel 231, secondary fuel channel 233, and/or simplex fuel channel 235. In this regard, heat shield area 232 may be filled with air to protect main fuel channel 231, secondary fuel channel 233, and/or simplex fuel channel 235 from coking.

In various embodiments, fuel injector 220 may be a LRU comprising at least three (3) fuel channels. Fuel injector 220 must be sufficiently small to be an LRU. In this regard, fuel injector 220 may be capable of being removed and/or serviced in a gas turbine engine without extensive disassembly of the gas turbine engine.

In various embodiments, fuel injector 220 and/or fuel nozzle 230 may be made from any suitable super alloy. Fuel injector 220 and/or fuel nozzle 230 may be made by an additive manufacturing process. By employing super alloys and additive manufacturing the installation envelope of fuel injector 220 and/or fuel nozzle 230 may be sufficiently small that fuel injector 220 is an LRU. In this regard, using super alloys and additive manufacturing methods may allow the fuel injector 220 and/or fuel nozzle 230 to have fuel channels and shapes that would not otherwise be achievable with traditional manufacturing processes.

In various embodiments, one or more of the fuel channels of fuel nozzle 230 may comprise passages having turns, non-uniforms diameters, non-uniform profiles, and/or non-standard flow paths. In this regard, the flow paths of each of main fuel channel 231, secondary fuel channel 233, and/or simplex fuel channel 235 may include turns, shapes, diameters, profiles, and/or orientations that are not achievable with traditional manufacturing processes. The fuel channels described herein and, more specifically, fuel nozzle 230 may be defined by the additive manufacturing processes described herein.

Figure 3:
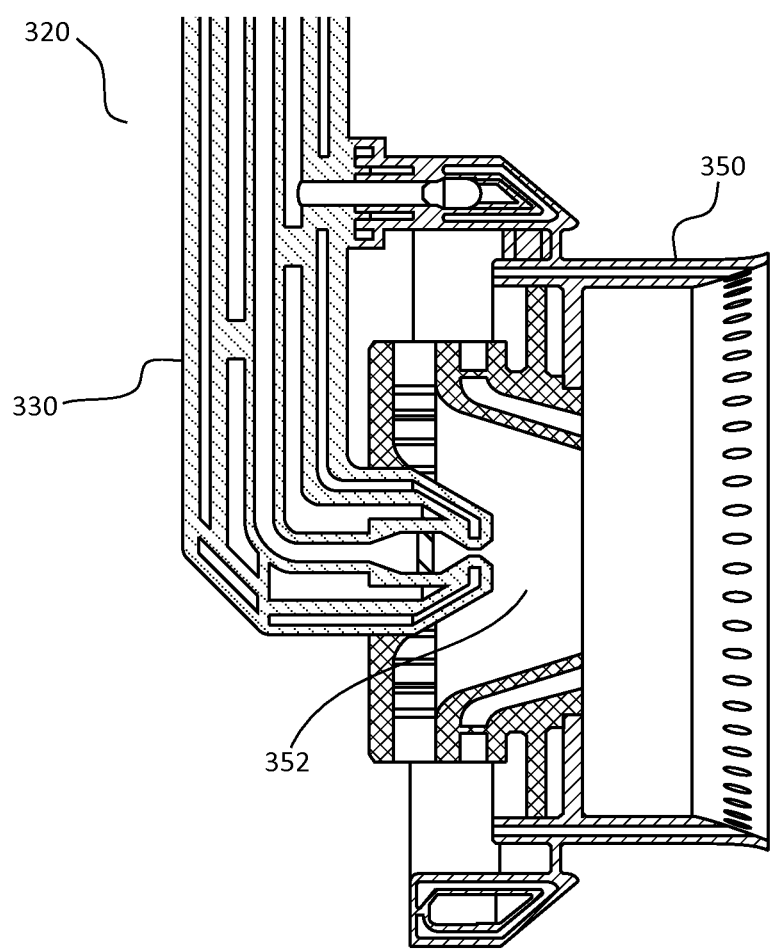
FIG. 3 illustrates a cross sectional view a portion of a gas turbine fuel injector, in accordance with various embodiments.

In various embodiments and with reference to FIG. 3, fuel injector 320 may be an assembly or may be a single unit. In this regard, where fuel injector 320 is an assembly, one or more components may be braised, coupled, welded and/or otherwise attached to one another in assembly process. In other manufacturing processes, fuel injector 320 may be of a single piece construction. For example, fuel injector 320 may be manufactured with an additive manufacturing process as discussed herein.

In various embodiments, where fuel injector 320 is an assembly, fuel nozzle 330 may be formed with an additive manufacturing process as discussed herein. Pilot stage 350 and pilot can 340 may be otherwise formed. For example, pilot stage 350 and pilot can 340 may be manufactured by traditional means and/or may be manufactured by an additive manufacturing process as discussed herein. Where fuel injector 320 is an assembly, fuel nozzle 330 may be operatively coupled to and/or attached to pilot stage 350 and/or pilot can 340 creating fuel injector assembly 320.

Figure 6:
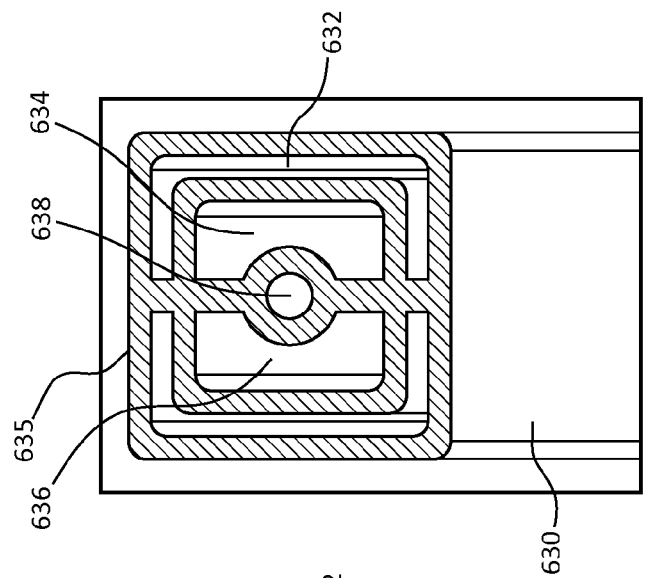
FIG. 6 illustrates a top perspective of a fuel nozzle have a third inlet configuration, in accordance with various embodiments.
Figure 5:
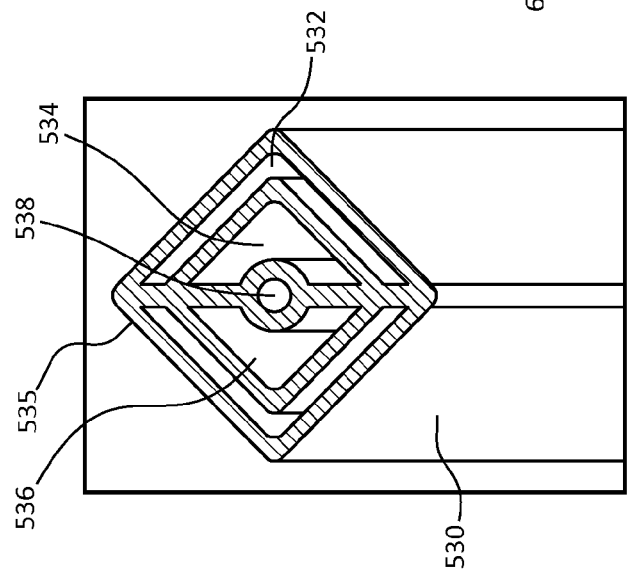
FIG. 5 illustrates a top perspective of a fuel nozzle have a second inlet configuration, in accordance with various embodiments.
Figure 4:
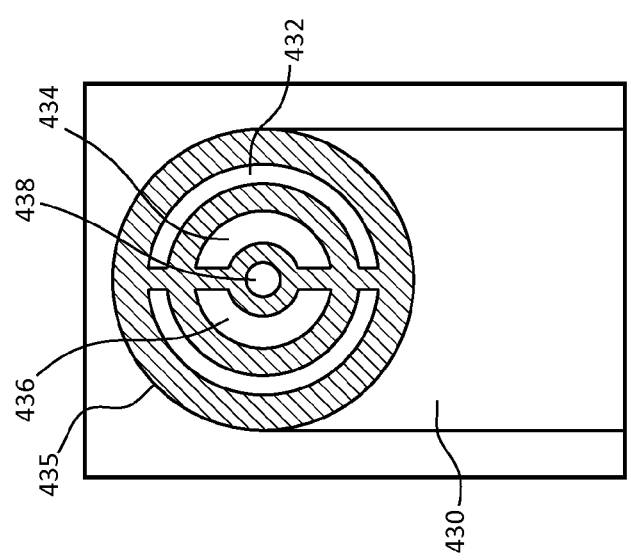
FIG. 4 illustrates a top perspective of a fuel nozzle have a first inlet configuration, in accordance with various embodiments.

In various embodiments and with reference to FIG. 4, FIG. 5, and FIG. 6, the various fuel nozzles described herein may have any suitable geometry, outer shape and/or exterior profile. Moreover, the geometry of the fuel nozzle may be defined to optimize manufacturing processes utilized to define the internal and/or external geometries and/or flow passages of the fuel nozzle.

In various embodiments and with specific reference to FIG. 4, fuel nozzle 430 may have an inlet 435 having a circular cross sectional geometry and/or profile. This circular geometry may define one or more radial flow passengers including, for example, heat shield flow area 432 that circumferentially surrounds main flow area 434, secondary flow area 436 and/or simplex flow area 438. In this regard and as discussed herein, heat shield flow area 432 may define a radial air flow passage that circumferentially surrounds main flow area 434, secondary flow area 436, and/or simplex flow area 438.

In various embodiments and with reference to FIG. 5, in fuel injector 530 may have an inlet 537 having a cross section that is a diamond shape and/or has a diamond profile. Fuel injector 530 may further comprise a heat shield fuel channel 532 that is defined on an outer perimeter and surrounds main fuel channel 534, secondary fuel channel 536, and/or simplex fuel channel 538 that are defined within the outer profile of inlet 537 of fuel injector 530.

In various embodiments and with reference to FIG. 6, fuel injector 630 may have and inlet 637 that has a cross section having a square profile and/or square shape. Fuel injector 630 may define a heat shield flow area 632. Heat shield flow area 632 may surround main flow area 634, secondary flow area 636, and/or simplex flow area 638. In this regard, heat shield flow area 632 may be configured to conduct air through a heat shield flow channel of fuel injector 630 that surrounds and insulates the fuel flowing through a fuel channel associated with main flow area 634, a fuel channel associated with secondary flow area 636, and/or a fuel channel associated with simplex flow area 638.

In various embodiments, and with reference to FIG. 4, FIG. 5, and/or FIG. 6, the various shapes and/or profiles of the fuel nozzle may be engineered and/or defined for ease and/or efficiency of manufacturing. In this regard, the outer profile and corresponding profiles of the channels defined within the fuel injector may be optimized to increase manufacturability and/or repeatability of the manufacturing process.

In various embodiments, the various components of fuel injector described herein may be separately formed and assembly as a fuel injector assembly and/or may be printed through various additive manufacturing processes. In this regard, where the fuel injector is printed in its entirety via an additive manufacturing process, the fuel injector may be a single piece assembly. For example, components that were traditionally separately created and assembly within a fuel injector of a gas turbine engine may otherwise be integrally formed with and defined by the additive manufacturing process. As a result, employing additive manufacturing processes may enable users to shrink the overall profile, design, and/or installation of fuel injectors, as described herein. Moreover, the additive manufacturing processes employed with these structures may allow the structures to take on non-traditional shapes that would otherwise be unachievable with traditional manufacturing processes. For example, fuel channels may have turns, profiles, and/or curves that would be otherwise not be manufactured with traditional manufacturing processes.

Benefits and advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, such benefits, advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fuel injector, comprising:
    a fuel nozzle, including a radially extending inlet stem, defining a main fuel channel, a secondary fuel channel, a simplex fuel channel and a heat shield area,
        wherein the heat shield area is disposed about and configured to separate and protect the main fuel channel, the secondary fuel channel and the simplex fuel channel from a heat load to prevent fuel coking,
        wherein a portion of the simplex fuel channel located in the radially extending inlet stem is of circular cross section defining a circumference having a first half and a second half, wherein the secondary fuel channel surrounds the first half circumference of the simplex fuel channel and the main fuel channel surrounds the second half circumference of the simplex fuel channel;
    a pilot stage operatively coupled to, and in fluid communication with, the fuel nozzle and configured to receive fuel from the the secondary fuel channel and the simplex fuel channel; and
    a main stage in fluid communication with and configured to receive fuel from the main fuel channel, wherein the simplex fuel channel is disposed in the center of the fuel nozzle and wherein the main fuel channel and the secondary fuel channel are disposed about the simplex fuel channel.

2. The fuel injector of claim 1, wherein the fuel injector is a line replaceable unit.

3. The fuel injector of claim 1, wherein the fuel nozzle has an outer profile that has a cross sectional shape that is at least one of a circle, a diamond, or a square.

4. The fuel injector of claim 1, wherein the fuel nozzle is produced by an additive manufacturing process.

5. The fuel injector of claim 1, wherein the fuel injector is a single piece made by an additive manufacturing process.

6. The fuel injector of claim 1, wherein at least one of the main fuel channel, the secondary fuel channel, or the simplex fuel channel includes a turn defined within the fuel nozzle.

7. The fuel injector of claim 1, wherein the radially extending inlet stem includes a main flow area in fluid communication with the main fuel channel, a secondary flow area in fluid communication with the secondary fuel channel, and a simplex flow area in fluid communication with the simplex fuel channel.

8. The fuel injector of claim 7, wherein the simplex flow area is disposed in the middle of the the radially extending inlet stem.

9. The fuel injector of claim 8, wherein the main stage is an area defined between a pilot can and a radial swirler.

10. The fuel injector of claim 8, wherein a heat shield flow area is disposed about the main flow area, the secondary flow area and the simplex flow area.

11. The fuel injector of claim 7, wherein the main flow area disposed about a portion of the simplex flow area and the secondary flow area is disposed about a portion of the simplex flow area.

12. The fuel injector of claim 11, wherein the main flow area and the secondary flow area are disposed circumferentially about the simplex flow area.

13. A gas turbine engine comprising,
    a compressor;
    a combustor in fluid communication with the compressor;
    a turbine in fluid communication with the combustor; and
    a fuel injector that is removable and installable within the combustor and configured to conduct fuel to the combustor, the fuel injector comprising: a fuel nozzle, including a radially extending inlet stem, defining a main fuel channel, a secondary fuel channel, a simplex fuel channel and a heat shield area,
        wherein the heat shield area is disposed about and configured to surround the simplex fuel channel,
        wherein a portion of the simplex fuel channel located in the radially extending inlet stem is of circular cross section defining a circumference having a first half and a second half, wherein the secondary fuel channel surrounds the first half circumference of the simplex fuel channel and the main fuel channel surrounds the second half circumference of the simplex fuel channel, and
        wherein the simplex fuel channel is disposed in the center of the fuel nozzle and wherein the main fuel channel and the secondary fuel channel are disposed about the simplex fuel channel;
    a pilot stage operatively coupled to, and in fluid communication with, the fuel nozzle and configured to receive fuel from the secondary fuel channel and the simplex fuel channel; and
    a main stage in fluid communication with and configured to receive fuel from the main fuel channel.

14. The gas turbine engine of claim 13, wherein the fuel injector is a line replaceable unit.

15. The gas turbine engine of claim 13, wherein the fuel injector is an assembly.

16. The gas turbine engine of claim 13, wherein the fuel nozzle is made from an additive manufacturing process.

17. A fuel injector, comprising:
a fuel nozzle having a radially extending inlet stem and defining a main fuel channel, a secondary fuel channel, a simplex fuel channel and a heat shield area,
wherein the inlet defines a main flow area in fluid communication with the main fuel channel, a secondary flow area in fluid communication with the secondary fuel channel, and a simplex flow area in fluid communication with the simplex fuel channel,
wherein the simplex fuel channel is disposed in the center of the fuel nozzle and wherein the main fuel channel and the secondary fuel channel are disposed about the simplex fuel channel,
wherein the heat shield area is configured to separate and protect the main fuel channel, the secondary fuel channel and the simplex fuel channel from a heat load to prevent fuel coking,
wherein a portion of the simplex fuel channel located in the radially extending inlet stem is of circular cross section defining a circumference having a first half and a second half, wherein the secondary fuel channel surrounds the first half circumference of the simplex fuel channel and the main fuel channel surrounds the second half circumference of the simplex fuel channel; and
wherein the fuel nozzle is formed as a single piece;
a pilot stage operatively coupled to, and in fluid communication with, the fuel nozzle and configured to receive fuel from the secondary fuel channel and the simplex fuel channel; and
a main stage in fluid communication with and configured to receive fuel from the main fuel channel.

18. The fuel injector of claim 17, wherein the fuel injector is a line replaceable unit.

19. The fuel injector of claim 17, wherein the fuel nozzle is formed by an additive manufacturing process.

20. The fuel injector of claim 17, wherein the pilot stage is defined by a pilot can, wherein a radial swirler is disposed about the pilot can, and wherein the main stage is defined between the pilot can and the radial swirler.

* * * * *